June 26, 1962

J. A. JENSEN 3,040,424

MAIN BEARING LIFTER

Filed Sept. 9, 1958

Jennings A. Jensen
INVENTOR.

BY
Attorneys

June 26, 1962
J. A. JENSEN
3,040,424
MAIN BEARING LIFTER
Filed Sept. 9, 1958
2 Sheets-Sheet 2
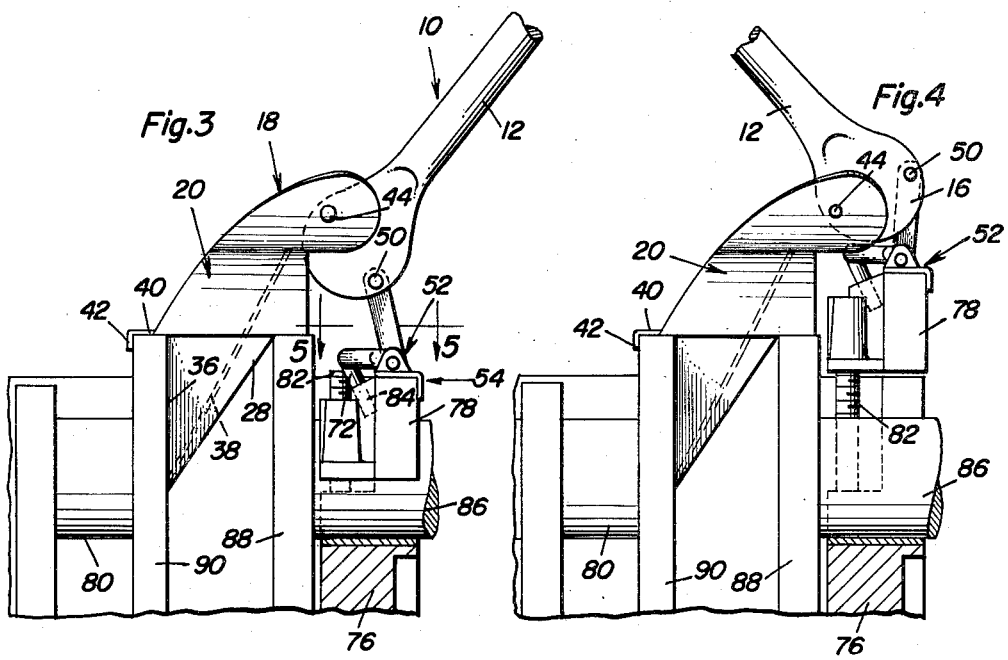
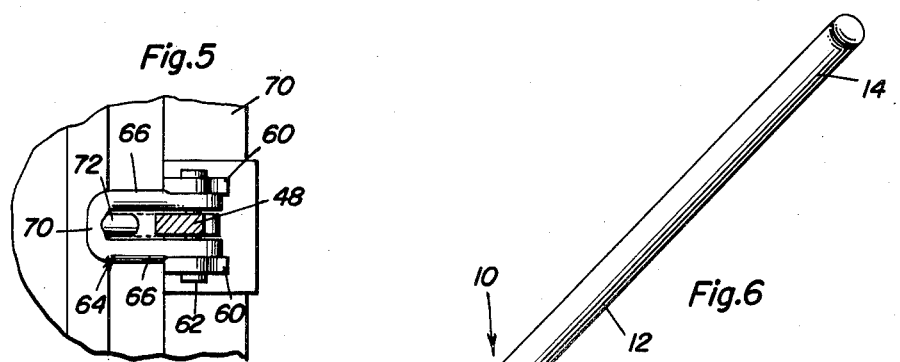
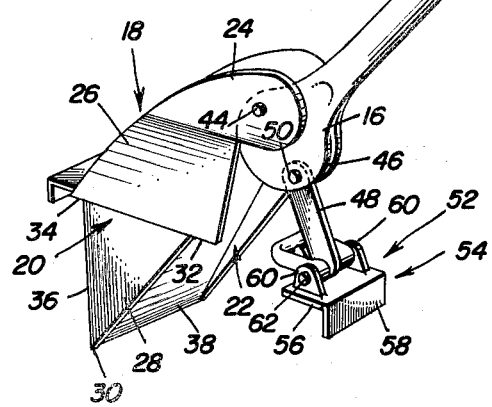
Jennings A. Jensen
INVENTOR.

United States Patent Office 3,040,424
Patented June 26, 1962

3,040,424
MAIN BEARING LIFTER
Jennings A. Jensen, 211 3rd St. N., Moorhead, Minn.
Filed Sept. 9, 1958, Ser. No. 759,918
3 Claims. (Cl. 29—267)

This invention relates in general to new and useful improvements in tools, and more specifically to a novel main bearing lifter for removing main bearings of engine blocks.

The crankshaft of an internal combustion engine is retained in the block of such engine by a plurality of main bearings. These main bearings are of the split type and include one-half formed in the block and a second half in the form of a bearing cap. The bearing caps are normally held in place by means of studs over which the main bearing caps are slid. In order to assure perfect alignment of the main bearing caps with the block, there is a close tolerance fit between the studs and the bores in the main bearing caps. Furthermore, there is an interlocking relationship between the main bearing caps and the block. In addition to this, there develops between the main bearing caps and the block an oil film which, due to its high cohesion, resists the removal of the main bearing cap. These factors all combined make it extremely difficult to remove the main bearing caps in most model engines.

In addition to the foregoing, normally the rear main bearing cap carries an oil seal to prevent the flow of oil through the rear main bearing cap into the flywheel housing. Because of this, the rear main bearing cap is normally wider than the remainder of the main bearing caps and therefore more difficult to remove.

In the Ford model 302 V8 engine, the rear main bearing cap is so interlocked with the block that it is practically impossible to remove except by hammering. This is undesirable inasmuch as the hammering on the bearing cap may distort or break the bearing cap. Inasmuch as the bearing caps are matched with the particular block of which they are a part, replacement of the bearing cap would be very expensive if not prohibitive.

It is therefore the primary object of this invention to provide a lifter which is particularly adapted for removing a rear main bearing cap of a Ford 302 V8 engine, the lifter being so constructed whereby it may be positioned in the engine and when so positioned, a mechanic may pull upon the handle thereof with the force exerted on the handle being transferred to the rear main bearing cap so as to lift it out of its position with respect to the block.

Another object of this invention is to provide a main bearing cap lifter, the main bearing cap lifter including an elongated lever which has attached thereto an attaching portion and a lifting head, the attaching portion being of such a nature whereby it may be engaged with counterweights of the crankshaft of the engine with the crankshaft forming a support for the bearing lifter whereby the bearing lifter may be actuated to remove the rear main bearing cap desired.

Another object of this invention is to provide an improved main bearing cap lifter which is primarily intended for removing the rear main bearing cap of an internal combustion engine wherein the rear main bearing cap is provided with an oil return opening for returning oil from the oil seal thereof, the bearing cap lifter having a finger engageable in the oil return hole for locking the lifter to the main bearing cap to facilitate the removal of the main bearing cap.

A further object of this invention is to provide an improved main bearing cap lifter for use in removing the rear main bearing cap of a Ford 302 V8 engine, the lifter including an elongated lever which has pivotally connected thereto anchoring means in the form of means interlockable with counterbalances of the crankshaft of the engine, and a lifting head, the lifting head including means for interlocking the same with a rear main bearing cap including a finger engageable in an oil return hole of the rear main bearing cap, and the anchoring means and the lifting head being pivotally connected to the lever so that when the lever is pivoted, the force applied to the lever will result in an upward lifting force on the rear main bearing cap so as to remove it from its position relative to the block.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a fragmentary sectional view taken through the engine and shows the specific relationship between the main bearing lifter and the component parts of the engine in a position with the lifter initially engaging the rear main bearing cap;

FIGURE 4 is a fragmentary sectional view similar to FIGURE 3 and shows the rear main bearing cap in an elevated position;

FIGURE 5 is a fragmentary sectional view taken substantially upon the plane indicated by the section line 5—5 of FIGURE 3 and shows specifically the details of the lifting head of the main bearing lifter, the view being on a large scale; and FIGURE 6 is a perspective view of the main bearing lifter removed from the engine.

Figure 1:
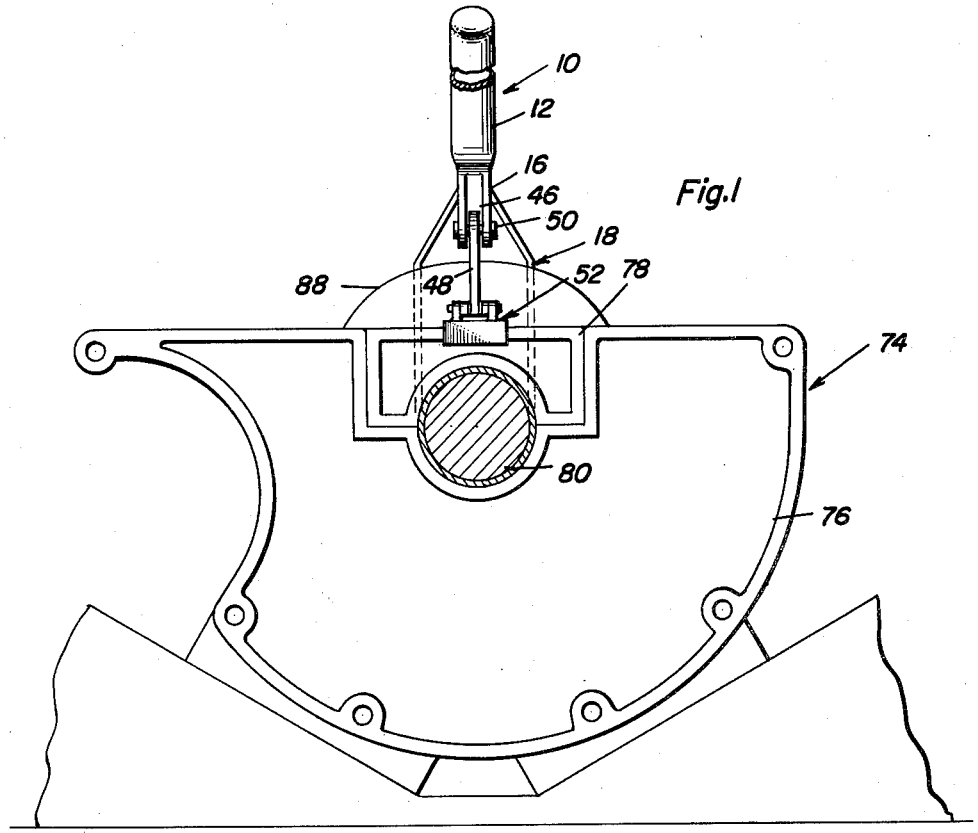
FIGURE 1 is a rear elevational view of an engine with the rear main bearing cap thereof being removed utilizing the main bearing lift which is the subject of this invention.
Figure 2:
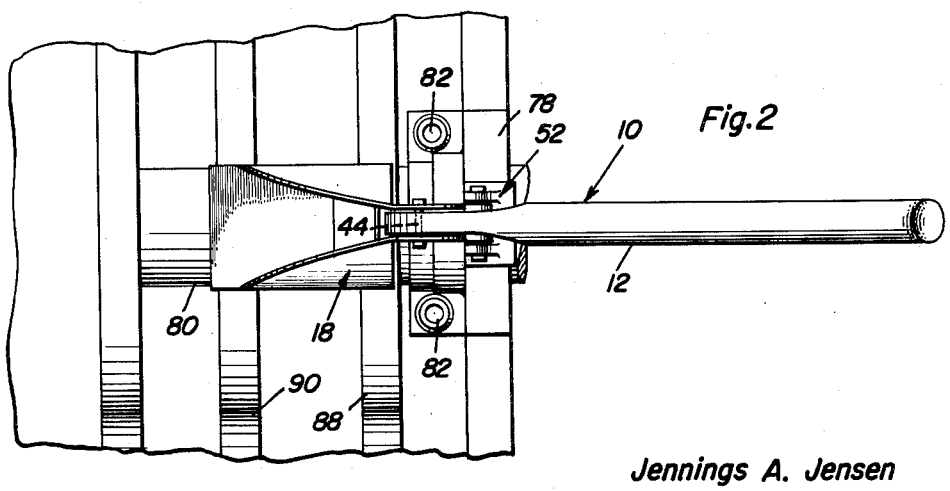
FIGURE 2 is a fragmentary plan view of the rear portion of the engine of FIGURE 1 showing the relationship between the main bearing lifter and the engine.

Referring now to the drawings in detail, it will be seen that there is illustrated in FIGURE 6 the main bearing cap lifter which is the subject of this invention, the lifter being referred to in general by the reference numeral 10. The lifter 10 includes an elongated lever 12 which terminates at one end in a handle portion 14 and which is provided at the opposite end thereof with a generally circular outline, flat head 16. Connected to the head 16 by pin 44 is an anchoring means or rest 18 for anchoring the lifter 10 during the removal of a rear main bearing cap.

The anchoring means or rest 18 includes a pair of spaced parallel plates, the plates being left and right and being referred to in general by the reference numerals 20 and 22. The plates 20 and 22 being lefts and rights, only the plate 20 will be described in detail. The plate 20 includes a vertical upper portion 24, a downwardly and outwardly sloping intermediate portion 26 and a lower portion 28 which is also vertical. The lower portion 28 is generally triangular in outline and terminates at the lower end thereof in a point 30. The upper edge of the lower portion 28 is of a lesser extent that the lower edge of the intermediate portion 26 so as to form a support area or seat 32 at the rear of the plate 20 and a support area or seat 34 at the front of the plate 20. The support areas 34 and 32 will be considered first and second support areas or seats, respectively. Further, the rear edge of the lower portion 28, which is referred to by the reference numeral 36, functions as a stop portion or abutment.

As is best shown in FIGURE 3, the plates 20 and 22 are connected together by a diagonally extending plate 38 which is disposed between the plates 20 and 22 and suitably secured thereto, such as by welding. The plate 38 is also shown in FIGURE 6.

In addition to the plate 38, the plates 20 and 22 are connected together by a horizontally disposed plate 40. The plate 40 has the undersurface thereof lying in the same plane as the support areas or seats 32 and 34 and actually functions as an extension of the support area 34. The portion of the rest 18 below plate 40 as viewed in FIGURE 3 comprises a tapered spacer and that portion of the rest above the tapered spacer comprises an upper triangular member. The plate 40 terminates in a downwardly directed rear flange 42 which, together with the plate 40, function as a retaining hook or securing means.

The upper portions of the plates 20 and 22 are disposed on opposite sides of the head 16 and are pivotally connected thereto by means of a pivot pin 44. The pivot pin 44 is disposed slightly eccentrically of the center of the head 16.

That portion of the head 16 remote from the anchoring means 16 is circumferentially grooved as at 46. Projecting into the groove 46 is a link 48 which is pivotally connected to the head 16 by means of a pivot pin 50. The pivot pin 50 is disposed eccentrically with respect to the center of the head 16 and remote from the pivot pin 44. Carried by the opposite end of the link 48 is a lifting head which is referred to in general by the reference numeral 52.

The lifting head 52 includes a hook member 54 which is formed of a generally horizontal portion 56 and a downwardly disposed forward portion 58. Carried by the horizontal portion 56 and projecting upwardly therefrom are spaced parallel ears 60 through which a pivot pin 62 passes, the pivot pin being carried by the lower end of the link 48.

The lifting head 52 also includes a yoke 64. The yoke 64 is formed of a pair of spaced parallel legs 66 which are connected together by a bight portion 70. The legs 66 are disposed on opposite sides of the link 48 and within the confines of the ears 60. The pivot pin 62 passes through the legs 66, as is best shown in FIGURE 5.

Secured to the bight portion 70 and projecting downwardly therefrom at an angle is a finger 72.

Referring now to FIGURES 1, 2, 3 and 4 in particular, it will be seen that there is illustrated a portion of a Ford 302 V8 engine which is referred to in general by the reference numeral 74. The engine 74 includes a block 76 which, among other components, includes a main bearing cap 78. The main bearing cap 78 is a rear main bearing cap and, together with other main bearing caps, serve to hold in place in supported relation a crankshaft 80. The engine block 76 is illustrated in FIGURE 1 in an inverted position ready for the removal of the crankshaft 80.

The rear main bearing cap 78 is interlocked with the block 76 and is held in place by a pair of studs 82. The rear main bearing cap 78 also is provided with an oil drain opening 84 which receives oil from a rear oil seal (not shown) carried by the rear main bearing cap 78 to prevent the flow of oil past the rear main bearing into that area of the engine 74 normally occupied by the flywheel.

The crankshaft 80 includes a journal 86 which rotates within the block 76 in the rear main bearing cap 78. Attached to this journal 86 is a counterweight 88. A similar counterweight 90 is disposed in spaced parallel relation to the counterweight 88. The opposite faces of the counterweights 88 and 90 are called cheeks.

When it is desired to remove the rear main bearing cap 70 employing the lifter 10, the crankshaft 86 is rotated until the counterweights 88 and 90 assume the positions illustrated in FIGURE 3. The plates 20 and 22 are then slid down between the counterweights 88 and 90 at which time the stop portions 36 thereof engage the rear cheek of the counterweight 90 and the support surfaces 34 and 32 engage the upper edges of the counterweights 90 and 88, respectively. Furthermore, the hook portion defined by the plate 40 and the flange 42 engages over the upper part of the counterweight 90 to prevent rearward movement of the lifter 10.

The lifting head 52 is then engaged with the rear main bearing cap 78 by first placing the finger 72 in the oil return hole 84 and then engaging the hook portion 54 over the upper rear part of the rear main bearing cap 78. The two, that is the finger 72 and the hook portion 54, combine to interlock with the rear main bearing cap 78.

When the lifter 10 is in the position illustrated in FIGURE 3, the lever 12 is pulled forwardly and as a result of the eccentric mounting of the pivot pins 44 and 50, an upward thrust is exerted on the lifting head 54. This upward thrust is exerted on the rear main bearing cap 78 which is in turn lifted upwardly on the studs 82 to a position free of the block 76 after which it may be removed by hand from the studs 82.

Due to the fact that the anchoring means 18 are firmly anchored on the crankshaft 80 and since there is a definite interlock between the lifting head 52 and the rear main bearing cap 78, it will be readily apparent that once the lifter 10 has been properly positioned on the engine 74, it is merely necessary to exert the proper force on the lever 12 to assure the removal of the rear main bearing cap 78.

Although the lift 10 is primarily designed for the removal of the rear main bearing cap of the Ford 302 V8 engine, it is to be understood that following the principles of this invention, main bearing caps of other types of engines may be removed. It will, of course, be necessary to redesign the lifting head depending upon the particular contour of the main bearing cap to be removed. Also, slight modifications in the anchoring means may be required depending upon the particular arrangement of the counterweights of the crankshaft of the engine from which the main bearing cap should be removed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tool for removing a main bearing cap from an engine block, said tool comprising an elongated lever terminating at one end in a handle portion and at the opposite end in a support portion having spaced opposite sides, a rest pivotally connected to one of the sides of the support portion, anchoring means on said rest for engaging and interlocking with crankshaft counterweights to anchor said lever, and a lifting head carried by said lever, said lifting head including connecting means for interlocking with a main bearing cap to be removed, said connecting means including a finger having a surface engageable in an oil return passage of a main bearing cap to be removed, and a hook member having a surface opposing said finger surface and cooperating therewith to grip the cap, said lifting head also including a support link connected to the other side of said support portion, means pivotally connecting said finger and said hook member to said supporting link whereby said surfaces may move on the pivot means and become aligned with adjacent surfaces on the bearing cap.

2. A tool for removing main bearing caps from an engine block, said tool comprising an elongated lever terminating at one end in a handle portion and at the other end in head portion, a rest pivotally connected to said head portion, said rest including a pair of spaced seats separated by a tapered spacer having a flat abutment on one side, securing means on said rest adjacent one of said seats having a surface facing the abutment, and a lifting head carried by said lever, said lifting head including a lifting finger, and a hook member opposing said lifting finger and cooperating therewith to grip a bearing cap, said lifting head also including a supporting link pivotally connected to said head portion at a point spaced from the pivot connection between said head portion and rest, and means pivotally connecting both said finger and said hook member to said supporting link for individual movement.

3. A tool as recited in claim 2 wherein said rest further includes an upper triangular member connected at its base to a side of said tapered spacer, the ends of the base of the upper triangular member extending beyond the tapered spacer and comprising said spaced seats.

References Cited in the file of this patent

UNITED STATES PATENTS

| | | |
|---|---|---|
| 493,392 | Wanamaker | Mar 14, 1893 |
| 627,028 | Walsh et al. | June 13, 1899 |
| 760,041 | Tauber | May 17, 1904 |
| 1,345,651 | Wilgus | July 6, 1920 |
| 1,356,978 | Graves | Oct. 26, 1920 |
| 1,663,061 | Rich | Mar. 20, 1928 |
| 2,210,904 | Durant | Aug. 13, 1940 |
| 2,224,031 | Kalbeck | Dec. 3, 1940 |
| 2,427,104 | Hosler | Sept. 9, 1947 |
| 2,623,489 | Webster | Dec. 30, 1952 |